US011232799B1

(12) United States Patent
Birthare et al.

(10) Patent No.: US 11,232,799 B1
(45) Date of Patent: Jan. 25, 2022

(54) SPEECH RECOGNITION ROUTING IN A PROVIDER NETWORK

(71) Applicant: Amazon Technologies, Inc., Seattle, WA (US)

(72) Inventors: Apoorv Birthare, Seattle, WA (US); John Baker, Kirkland, WA (US); Kranthi Kumar Boyapati, Seattle, WA (US); Krishna Chaitanya Gourishetti, Bellevue, WA (US); Enrico Sartorello, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 16/177,164

(22) Filed: Oct. 31, 2018

(51) Int. Cl.
*G10L 15/00* (2013.01)
*G10L 15/30* (2013.01)
*G10L 15/22* (2006.01)
*H04L 29/08* (2006.01)
*G06N 20/00* (2019.01)
*G10L 15/26* (2006.01)

(52) U.S. Cl.
CPC .............. *G10L 15/30* (2013.01); *G06N 20/00* (2019.01); *G10L 15/22* (2013.01); *H04L 67/1002* (2013.01); *G10L 15/26* (2013.01); *G10L 2015/225* (2013.01)

(58) Field of Classification Search
CPC combination set(s) only.
See application file for complete search history.

(56) References Cited

U.S. PATENT DOCUMENTS

2009/0150156 A1* 6/2009 Kennewick ............. G10L 15/00
704/257

* cited by examiner

*Primary Examiner* — Vu B Hang
(74) *Attorney, Agent, or Firm* — Nicholson De Vos Webster & Elliott LLP

(57) ABSTRACT

Techniques for speech recognition are described. For example, a speech recognition service is to receive a request to perform speech recognition on speech data from a chatbot using a particular speech recognition service; determine a group of hosts to route the speech data to, the group of hosts to host a plurality of speech recognition services including the particular speech recognition service; determine a path to the determined group of hosts using a set of one or more rules; determine a particular host of the group of hosts to perform speech recognition on the speech data, the particular host having the speech recognition service in memory to process the request and being preferred for performing the speech recognition on the speech data; route the speech data to the particular host; perform speech recognition on the speech data using the particular host; and provide a text result of the speech recognition.

20 Claims, 16 Drawing Sheets

Example Rule 801
```
{
"RULENAME": "ALWAYS_TRUE",
"CONDITION": "TRUE",
"CELLGROUP": {
    "ENDPOINTPATH": "HTTP://....",
    "CELLNAME: US-ENGLISH-CELL-1"
    }
}
```

Example Rule 803
```
{
"RULENAME": "BOT_ID_RULE",
"CONDITION": "BOTID == 'YYYY'",
"CELLGROUP": {
    "ENDPOINTPATH": "HTTP://...",
    "CELLNAME: SR1"
    }
}
```

Example Rule 805
```
{
"RULENAME": "ACCOUNT_ID_RULE",
"CONDITION": "ACCOUNTID == 'XXXX'",
"CELLGROUP": {
    "ENDPOINTPATH": "HTTP://...",
    "CELLNAME: SR2"
    }
}
```

Example Rule 807
```
{
"RULENAME": "ACCOUNT_ID_RULE",
"CONDITION": "BOTID=='ABCD' && "ACCOUNTID == 'ZZZZ'",
"CELLGROUP": {
    "ENDPOINTPATH": "HTTP://...",
    "CELLNAME: SR3"
    }
}
```

Example Rule 809
```
{
"RULENAME": "LOCALE_SPECIFIC_RULE",
"CONDITION": "LOCALE=='EN_LA' && FREQUENCY=='16' && AUDIOPROFILE=='FF'",
"CELLGROUP": {
    "ENDPOINTPATH": "HTTP://...",
    "CELLNAME: SR4"
    }
}
```

Example Rule 811
```
{
"RULENAME": "TESTING",
"CONDITION": "BOTID=='ABCD' && "ACCOUNTID == 'YYYY'",
"CELLGROUP1": {
    "ENDPOINTPATH": "HTTP://...",
    "CELLNAME: SR4"
    }
"CELLGROUP2": {
    "ENDPOINTPATH": "HTTP://...",
    "CELLNAME: SR5"
    }
}
```

*FIG. 8*

SPEECH RECOGNITION ROUTING IN A PROVIDER NETWORK

BACKGROUND

Services for building conversational interfaces into any application using voice and text may utilize advanced deep learning functionalities of automatic speech recognition (ASR) for converting speech to text, and natural language understanding (NLU) to recognize the intent of the text, to enable building applications with highly engaging user experiences and lifelike conversational interactions are being developed.

Speech recognition and natural language understanding are some of the most challenging problems to solve in computer science, requiring sophisticated deep learning algorithms to be trained on massive amounts of data and infrastructure.

BRIEF DESCRIPTION OF DRAWINGS

Various embodiments in accordance with the present disclosure will be described with reference to the drawings, in which:

FIG. 8 illustrates examples of rules to be used to generate a path for a load balancer to use.

DETAILED DESCRIPTION

Various embodiments of methods, apparatus, systems, and non-transitory computer-readable storage media for automatic speech recognition in a provider network are described. In particular, embodiments directed to auto-scaled, distributed, multi-tenant hosting of machine learning models for ASR are detailed.

ASR takes spoken language (audio) and provides a text response. This text response is in natural language form and is not structured. Each instance of an ASR service contains a speech recognition engine to execute a bot and one or more model files. Unfortunately, these items may be large in size (up to multiple gigabytes (GBs)). For example, in some implementations the speech recognition engine is on the order of 25+ GBs, a static language model file on the order of 2-5+ GBs, an acoustic model file on the order of 0.5-1 GB, supplemental model file(s) on the order of several kilobytes to megabytes each, and an application bot that is on the order of several kilobytes to megabytes. As such, it may be impractical to have on a single physical device multiple ASR services. Detailed herein are embodiments using granular control over the routing of ASR requests to an appropriate ASR service of a provider network such that the impact of each ASR service is spread out. This should also lead to less swapping of ASR services that would occur if a single hardware device was to "simultaneously" be responsible for running a plurality of ASR services. In other words, to accommodate a plurality of ASR services, one would have to keep swapping out the large files detailed above if using a single hardware device leading to not only extra network and/or interconnect traffic, but higher power usage and latency.

Further, certain users of a provider network might require isolation of their ASR data from other customers, therefore the ability to route individual requests to a specific ASR service is desirable. In some embodiments, the routing is further controlled per language, customer or bot.

Figure 1:
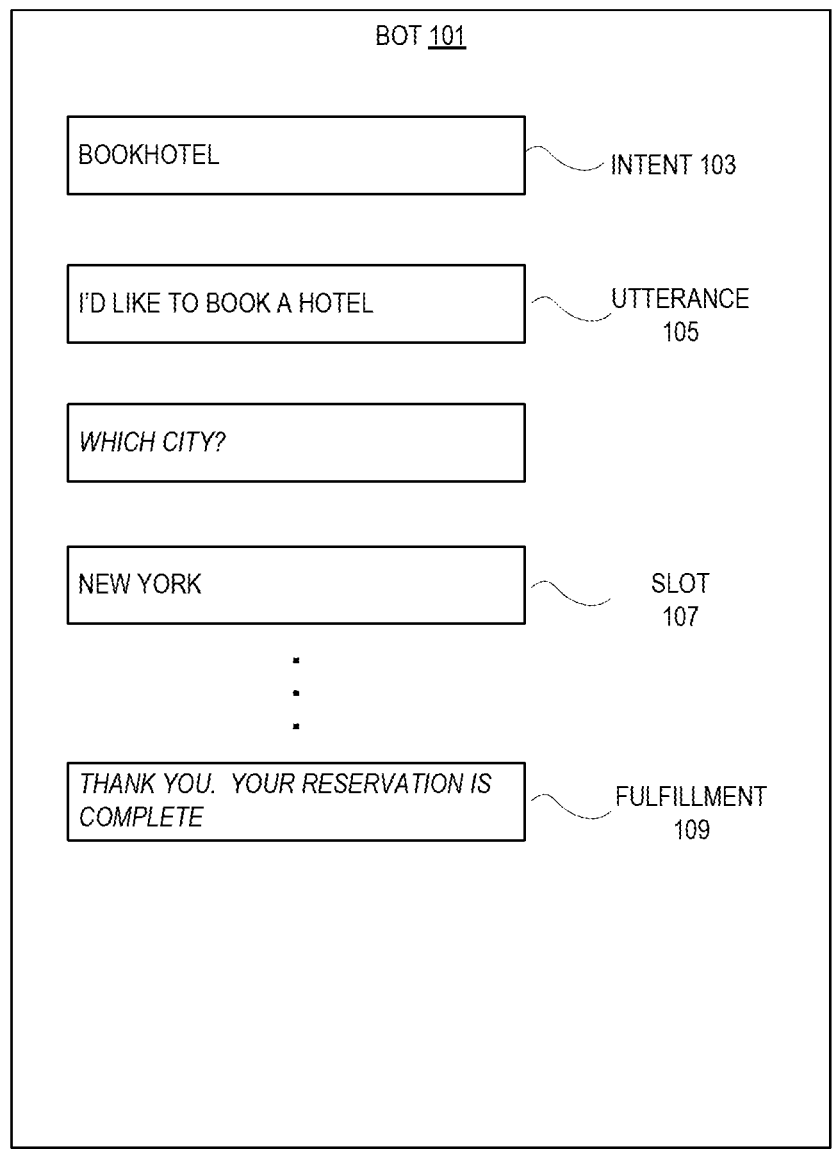
FIG. 1 illustrates an example embodiment of a bot usage.

FIG. 1 illustrates an embodiment of a bot usage. In this example, the bot 101 is used to intake user input (such as utterances) and to provide responses to the input (shown in italics). In this example, the intent 103 of the bot 101 is to book a hotel. An intent represents an action to take in response to natural language input.

A user provides an utterance 105 in the form of a spoken or typed phrase that invokes the intent 103. When the utterance 105 is spoken, it is subjected to ASR as will be detailed herein. Natural language understanding (NLU) is performed on the typed and/or ASR subjected utterances such as "I'd like to book a hotel" and "New York" in this example.

Slots 107 are input data required to fulfill the intent. Each slot has a type. A slot type is a list of values used to train a machine learning model to recognize values for a slot (e.g., "New York" in this example).

Finally, the bot 101 provides an indication of fulfillment.

Figure 2:
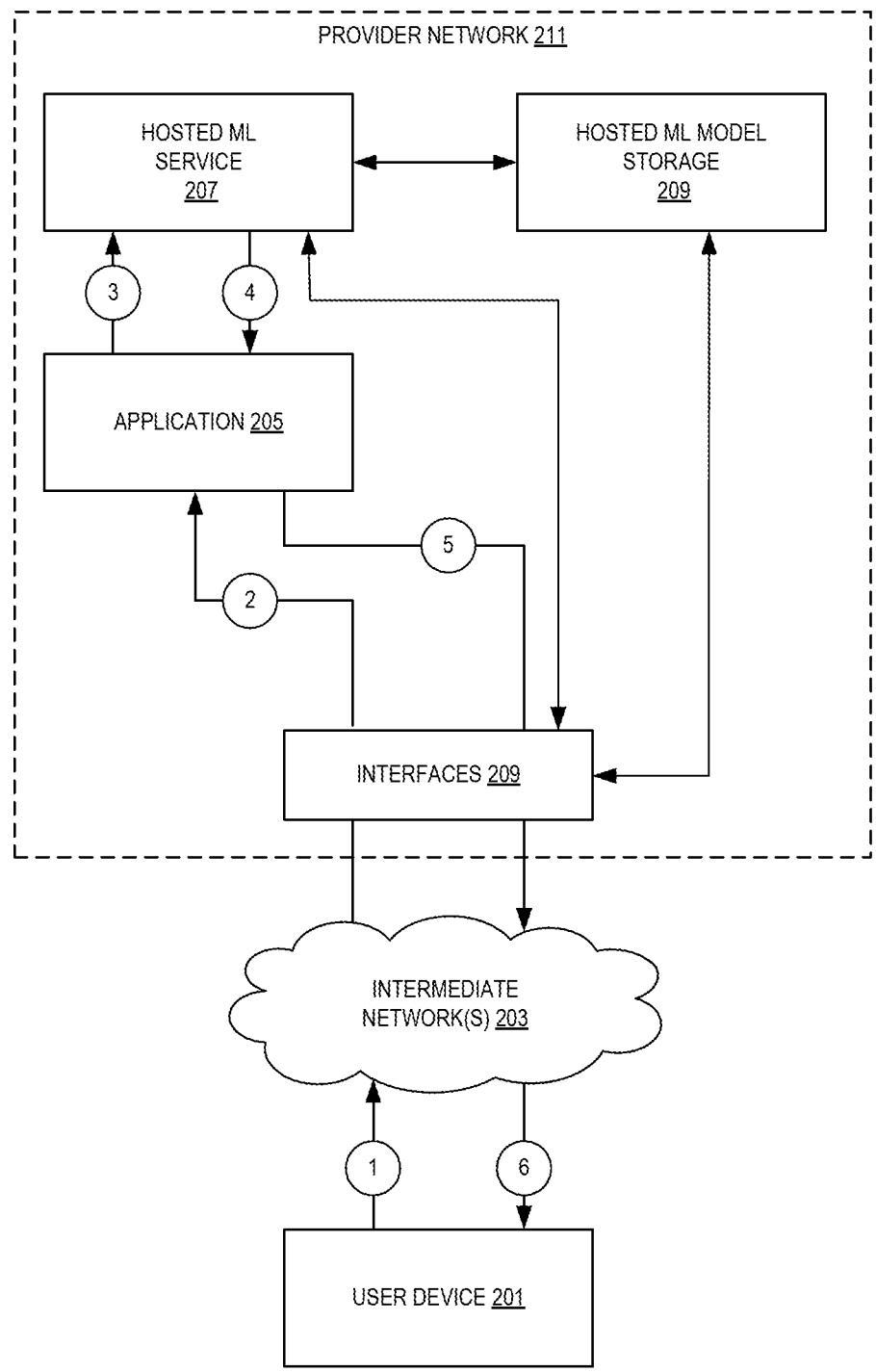
FIG. 2 illustrates embodiments of a system for performing at least ASR operations.

FIG. 2 illustrates embodiments of a system for performing at least ASR operations. As shown, a provider network 211 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least ASR (and in some embodiments, NLU based on the ASR). These and other computing resources may be provided as services, such as a hardware virtualization service that can execute compute instances, a storage service that can store data objects, etc. The users (or "customers") of provider networks 211 may utilize one or more user accounts that are associated with a customer account, though these terms may be used somewhat interchangeably depending upon the context of use. Users devices 201 may interact with a provider network 211 across one or more intermediate networks 203 (e.g., the internet) via one or more interface(s) 209, such as through use of application programming interface (API) calls, via a console implemented as a website or application, etc. The interface(s) 209 may be part of, or serve as a front-end to, a control plane of the provider network 211 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

In this illustration, the provider network 211 provides ASR services including, but not limited to, ASR on utterances in support of an application 205. As shown, at circles 1 and 2, a user device communicates with the provider network 211 via intermediate networks 203 and interfaces 209. In particular, the user device communicates with an application 205 (such as a bot) that utilizes the hosted ML service 207. Note that this is exemplary, and this application 205 is not utilized in all instances. An example of a communication is an "utterance" and this example will be used throughout the remainder of this description.

The application 205 takes the utterance and makes a request to the hosted ML service 207 at circle 3. The hosted ML service 207 hosts machine learning (ML) models for different entities on a shared fleet of physical and/or virtual hosts. The compute capacity used for the ML models may be scaled with the throughputs of bots and allows the fleet to scale with the total memory consumption of the ML models. The hosted ML models may be custom (customer provided) or provided by the service. The hosted ML service 207 includes, in this example, an ASR component which performs one or more ASR operations on the utterance using a ML model it acquired from hosted ML model storage 209.

The results of the operation are returned to the application 205 at circle 4 and then forwarded back to the user device as needed in circles 5 and 6.

Figure 3:
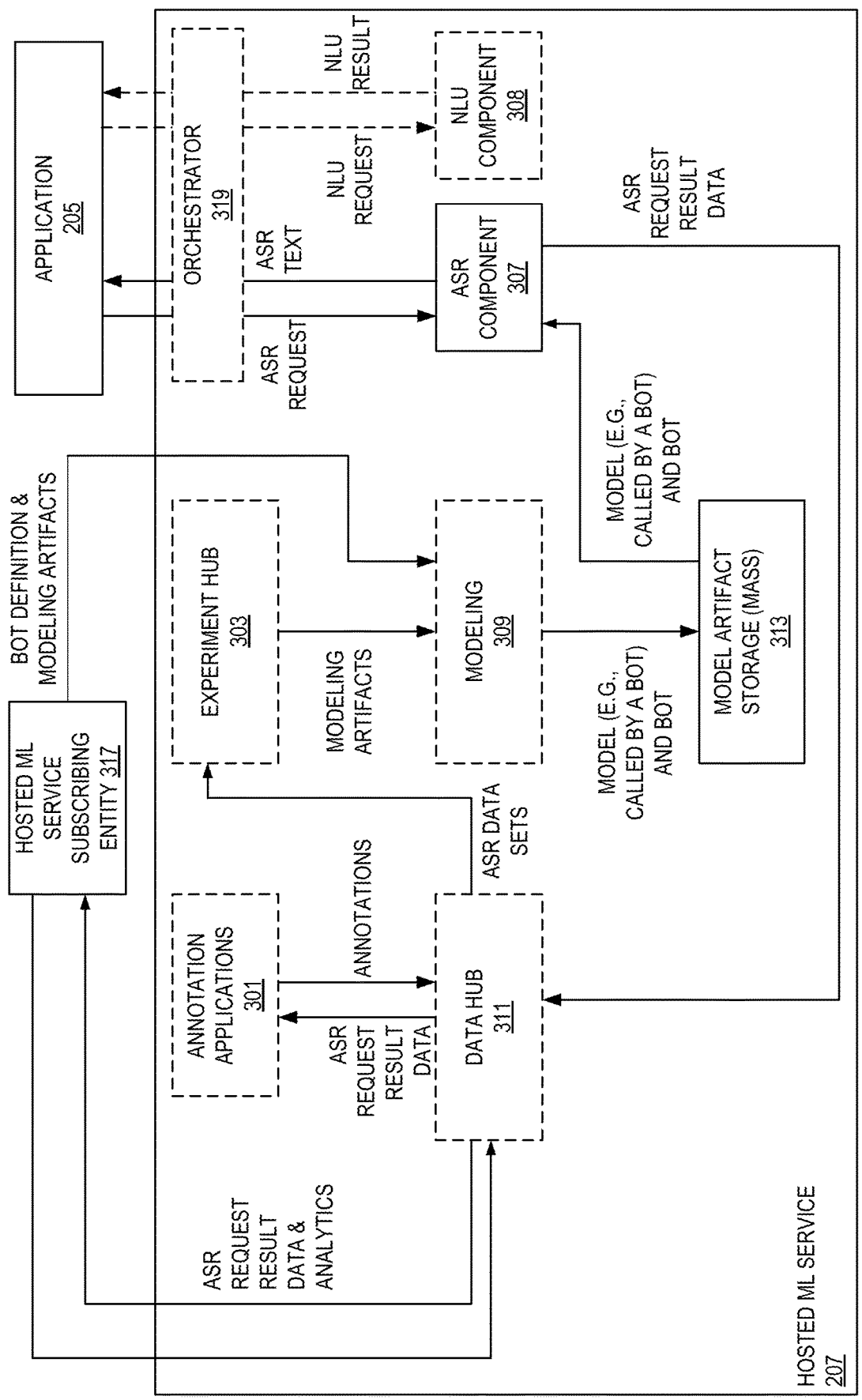
FIG. 3 illustrates embodiments of a system for handling ASR analysis in a provider network along with an application and a hosted ML service subscribing entity.

FIG. 3 illustrates embodiments of a system for handling ASR analysis in a provider network along with an application and a hosted ML service subscribing entity. In particular, embodiments of a hosted ML service 207 that supports ASR are shown.

A service subscribing entity 317 provides bot definitions and/or modeling artifacts (ML models) to the hosted ML service 207. An application 205 interfaces with the provided bot(s) and/or modeling artifacts (model, training data, etc.).

An ASR service component 307 serves ASR requests to interpret audio data into text. In some embodiments, the ASR service component 307 uses consistent hashing routing to route ASR requests to particular cell groups (CGs), where each CG includes at least one auto-scaling group of hosts. Cell groups are discussed in more detail later. Further, in some embodiments, a load balancer of the ASR service component 307 uses target groups and listener rules with path-based routing to route the requests to the CG. Each CG hosts a set of models and scales based on the throughput of the models hosted in the CG. Details of some embodiments of the ASR service component 307 are detailed in subsequent figures and corresponding discussion.

In some embodiments, an NLU service 308 serves inference requests to extract information (such as domain, intent, and/or slot labels) from utterances provided by the application 205 (such as via a bot) and structure the extracted information in a developer-consumable way (such as slot resolution). The NLU service 308 performs one or more of preprocessing text, loading necessary artifacts, invoking algorithms for machine learning tasks such as intent classification and slot labeling, postprocessing the output, and/or dialog frame merging.

In some embodiments, an orchestrator 319 determines where to direct requests from the application 205. For example, an audio utterance may first be sent to the ASR component 207 as a ASR request and the responsive ASR text may be sent to the NLU component 308 as a part of a NLU request. In other embodiments, the application 205 makes this determination.

A model artifact storage (MASS) 313 is an available and scalable data store that persists model artifacts to be used by the ASR component 307. In some embodiments, the MASS 313 is optimized for read access (serves most of the read traffic from cache). In some embodiments, ML model storage 209 at least includes the MASS 313.

In some embodiments, the hosted ML service 207 includes a modeling component 309 which produces items to be used for ASR. As such, the modeling component 309 serves requests to create and manage all modeling artifacts. Examples of items that are produced include, but are not limited to: static language model files, acoustic model files, phone model files, language models, bots, etc.

In some embodiments, a data hub 311 stores and serves data pertaining to ASR (such as ASR request result data, analytics, ASR data sets, etc.) to one or more entities such as a hosted ML service subscribing entity 317, annotation applications 301, and an experiment hub 303. The data hub 311 allows for querying of ASR requests and annotation of resultant ASR text. The data hub 311 exports ASR data and/or analytics.

In some embodiments, the experiment hub 303 provides a secure environment with the tools to access ASR data (from the data hub 311) and perform experiments with them. Artifacts produced using the experiment hub 303 are published to the MASS 313 via the modeling component 309.

In some embodiments, the annotation applications 301 are a collection of tools used to annotate ASR data provided by the data hub 311.

Figure 4:
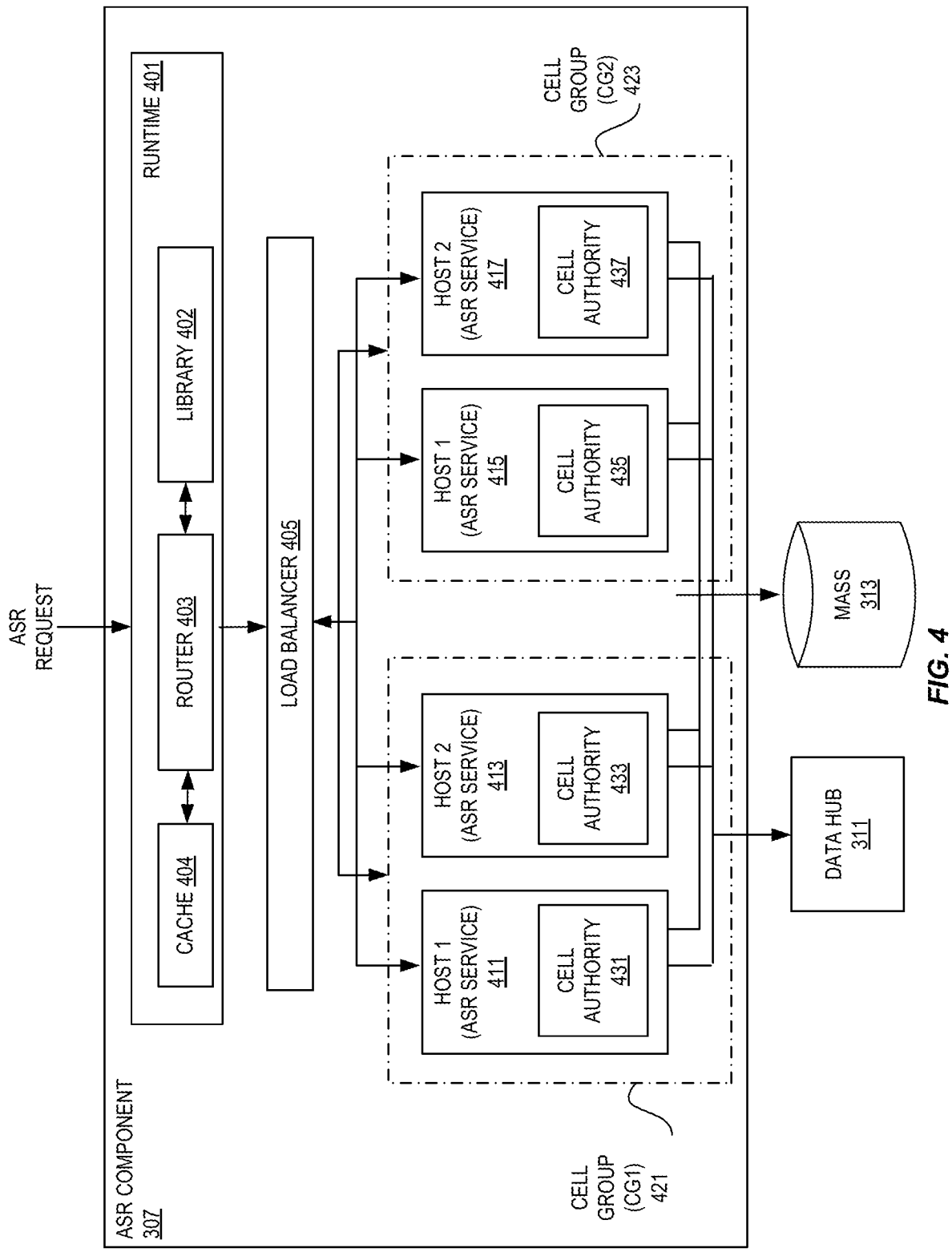
FIG. 4 illustrates embodiments of an ASR component such as ASR component 307.

FIG. 4 illustrates embodiments of an ASR component such as ASR component 307. An ASR component comprises one or more autoscaling ASR service hosts 411-417 that are a part of one or more CGs 421 and 423. As shown, each CG 421 and 423 is a collection of ASR service hosts that serve the same set of models. A CG 421 or 423 is implemented using scaling groups for service hosts that can scale up or down based on the throughput of the models that are hosted in the CG 421 or 423. A CG represents a runtime environment for a group of static models. A CG provides both an abstraction over the runtime of models, as well as isolation with other CGs.

The ASR service hosts 411-417 of the CGs 421 or 423 host interference services that perform ASR operations on received audio data and make the results of such ASR operations available (such as provide to a requestor and/or store in the data hub 311). In some embodiments, an ASR service is a collection of containerized micro-services that are hosted on the same host and work together to generate ASR text. In some embodiments, ASR hosts 411-417 include a cell authority 431-437 to help the respective host determine what models it should serve. The cell authorities 431-437 calls the router 403 to gets its ASG, the load balancer 405 to get its target group name, and then the library 402 to get the model(s) it should serve. The model(s) is/are then retrieved from MASS 313.

As noted above, a router 403 receives audio data from an ASR client to be processed. The router 403 determines a bot model, language, and customer and constructs a route (such as a URI or URL) to a determined CG. Coupled to, or a part of the router 403 is a library 402 used to provide rule-based logic to determine the correct CG. In some embodiments, the library 402 is exposed as a service. In some embodiments, the router 403 gets configuration from a dynamic database.

The load balancer 405 then uses static routing rules (e.g., model, language, customer, etc.) to select an auto-scaling group (ASG) having one or more hosts (such as hosts 411, 413, 415, or 417) to serve request. Each ASG has a specific configuration of an ASR with a static finite state transducer (FST) and supplemental FSTs. In some embodiments, each version of the static model is deployed as a micro-service running on an auto-scaling group. FSTs are directed graphs used in ASR to assist in determining words that might be used together. These graphs have edges with weightings which allow for probablistic reasoning on the paths chosen. This architecture allows for horizontal scaling of the fleet for all the variations of a static model (like language, close talk/far-field, model-names, model-versions, etc.).

In some embodiments, the load balancer 402 includes a component used to perform heath checks on hosts, etc.

Figure 5:
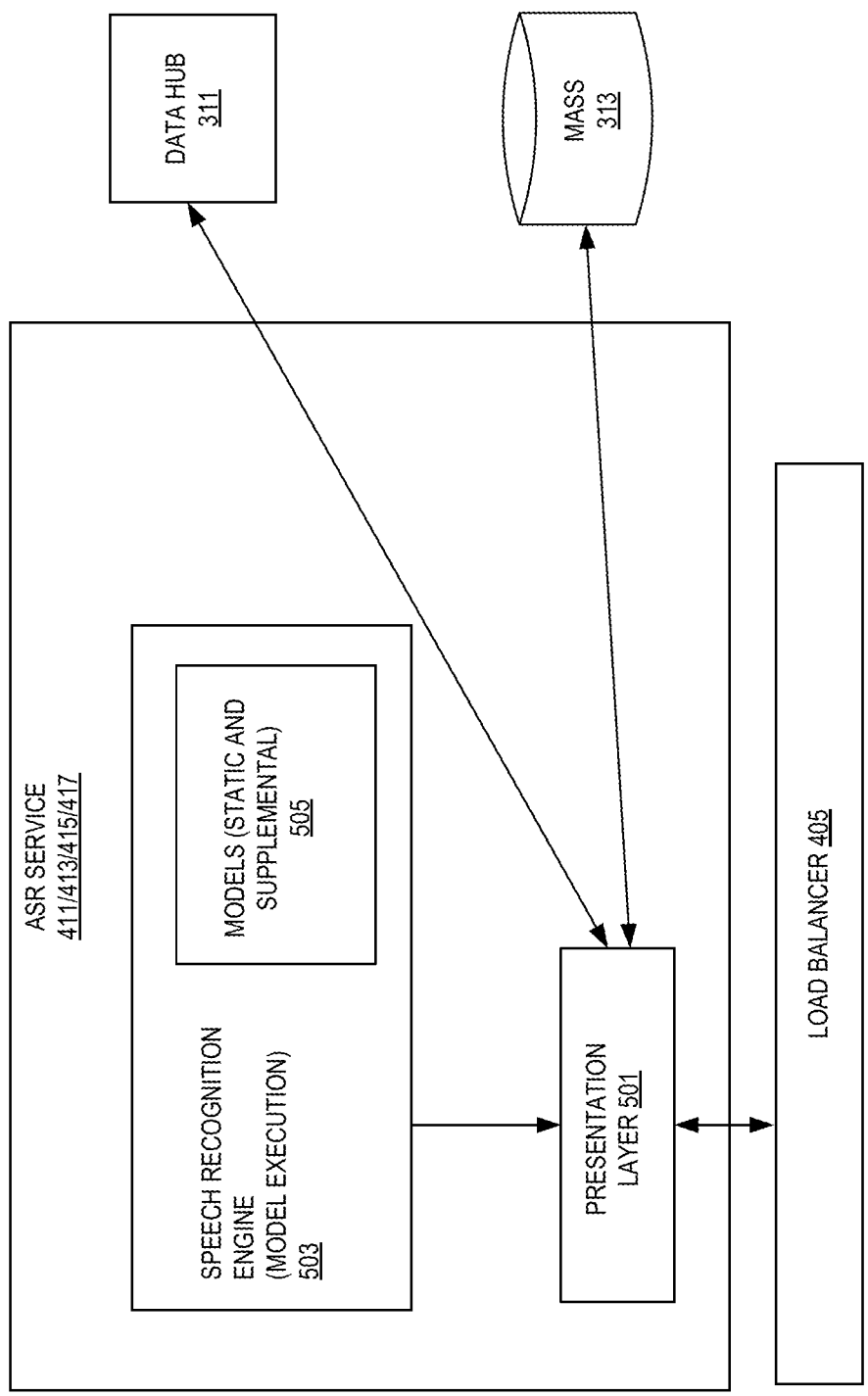
FIG. 5 illustrates embodiments of an ASR service on a host.

FIG. 5 illustrates embodiments of an ASR service (such as ASR service 411, 413, 415, or 417) on a host. The entry point of the ASR service 411/413/415/417 is a presentation layer 501. The presentation 501 interfaces with the load balancer 402 and other external entities such as the data hub 311 (for example, to store results) and MASS 313 (for example, to retrieve models (static and supplemental), etc. 505 to be used by the speech recognition engine 503 to perform ASR). As such, the ASR service 411/413/415/417 instance has the appropriate models 505 to process.

The speech recognition engine 503 uses one or more models (static and supplemental) 505 to perform its analysis of the audio data. Processing speech to text with an ASR service uses decomposed input audio that is fed into an acoustic model. The acoustic model maps to phones (common sounds for a particular language) and then the phones are mapped to words.

For bots, processing audio to text uses an ASR service which is trained to bias the language towards the bot specific utterances. This training produces a bot-specific FST which supplements the language-specific FST to produce the text from the phones.

A bot-specific FST contains the weightings for the sample utterances used to build the bot and includes the references to built-in FSTs such as "Alphanumeric." Since bots are composed of intents, slots, and slot types, then they each have their own FSTs. Intent FSTs refer to the slot FST which refer to the slot type FSTs. Therefore, the bot artifact spectrum contains the "manifest" of all the built-in or supplemental FSTs which the bot depends upon.

Supplemental FSTs are built-in FSTs and the bot-specific FST contains references to the supplemental FSTs. There are two types of supplemental FSTs: grammar and catalog. A grammar-based supplemental FST allows for definition of a syntax which could be valid to augment the language. A catalog-based supplement FST is a defined list of items which are allowed to augment the language.

Static FSTs or language-specific FSTs are large files containing the general language model.

Figure 6:
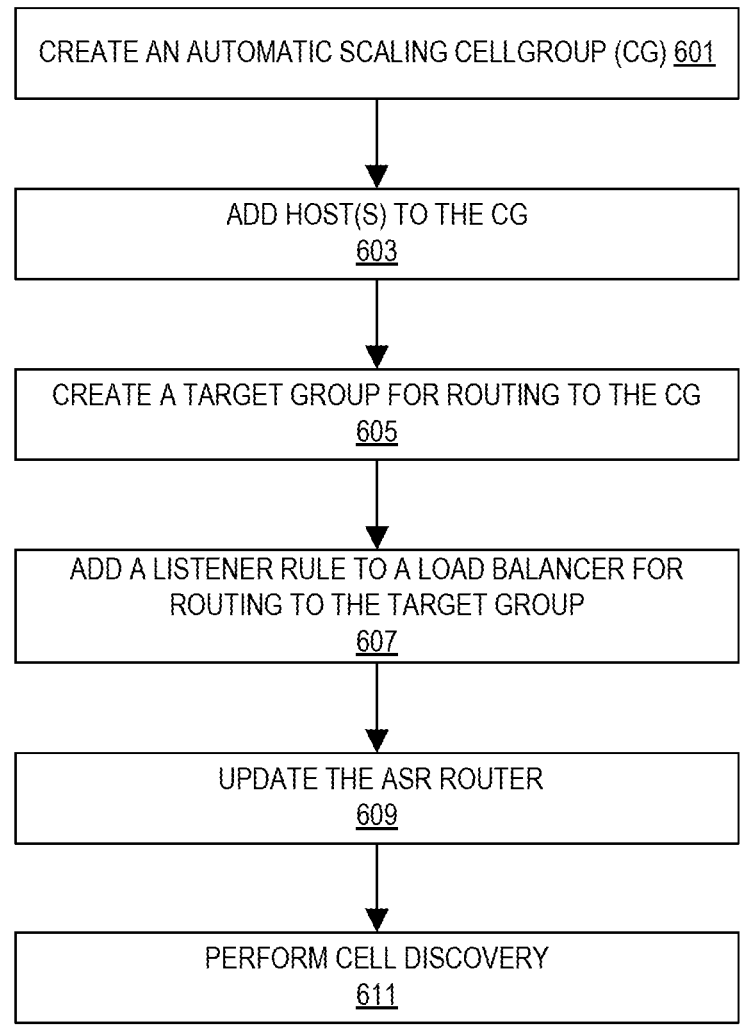
FIG. 6 illustrates embodiments of a method for configuring a CG.

FIG. 6 illustrates embodiments of a method for configuring a CG. In some embodiments, aspects of the method are performed by the ASR component 307. In some embodiments, aspects of the method are performed by a front end (such as interfaces 209).

At 601, an auto scaling group (ASG) for a CG is created. For example, a user provides configuration information for an ASG for the CG through a web interface of the provider network and the front end of the provider network then configures the ASG for the CG.

Hosts are added to the created ASG at 603. For example, a user provides information as to which hosts are to be added to the ASG for the CG through a web interface of the provider network and the front end of the provider network then configures the ASG to include one or more hosts for the CG.

A target group is created for routing to the created CG at 605. A target group is used to route requests to one or more registered targets based on listener rules. Listener rules define how the load balancer 405 is to route requests to the targets in one or more target groups. In some embodiments, each listener rule consists of a priority, action, optional host condition, and optional path condition. When a rule condition is met, traffic is forwarded to a corresponding target group.

One or more listener rules are placed into load balancer 405 for routing to the above target group with path-based routing at 607. For example, a listener rule like "/CG1/*'→target-group1" cause requests like "ASR-worker.awsamazon.com/CG1/" route to CG1.

The router 403 is updated to start routing to the newly created CG at 609. In some implementations this updating is called discovery. In essence, the router 403 knows the list of CGs that it supports both to use consistent hash-based routing and to construct a URL for routing. In some embodiments, to update the list, an entry is manually entered into a whitelist configuration, however, it will not require a deployment to propagate the change.

In some embodiments, cell discovery is performed at 611 using one or more cell authorities such as those detailed above.

Figure 7:
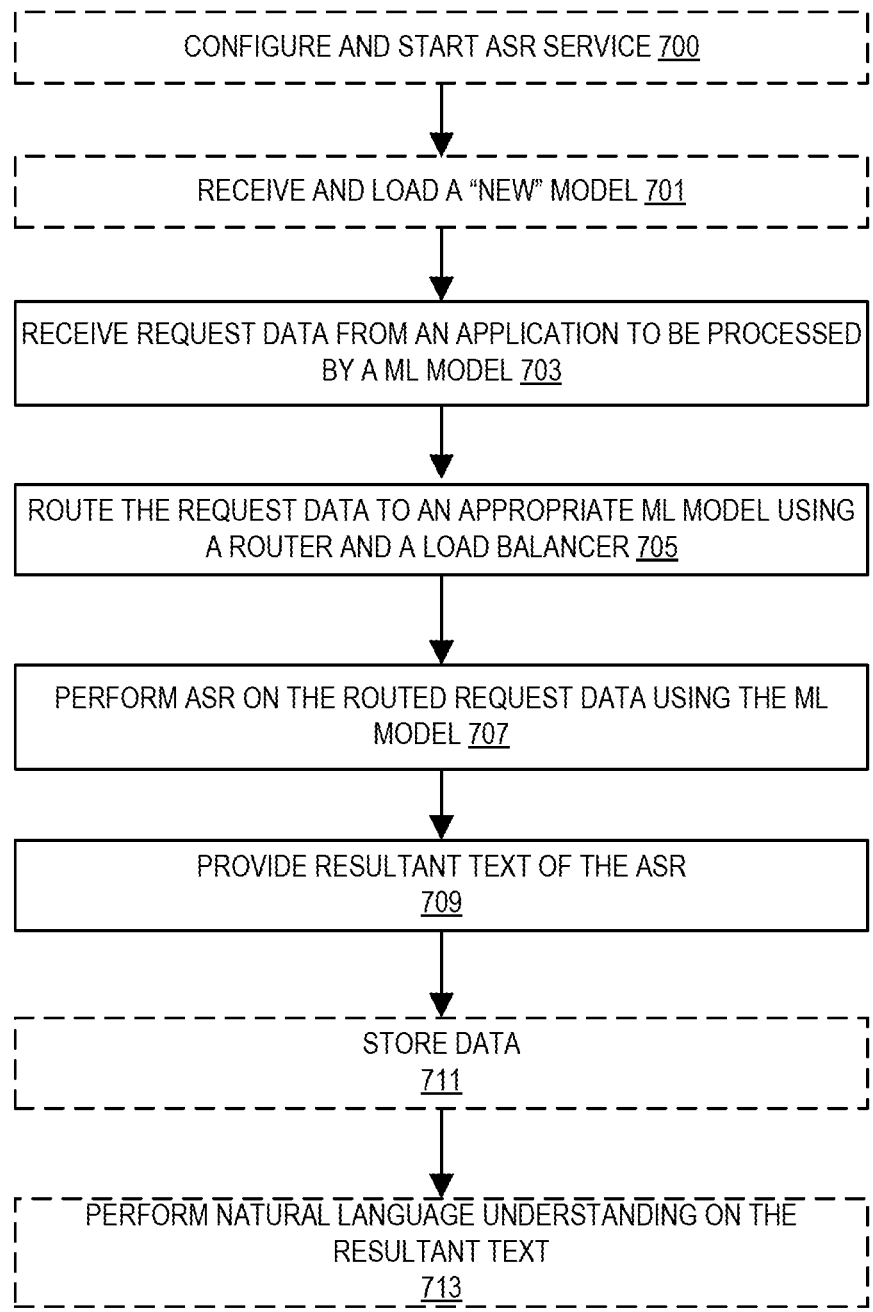
FIG. 7 illustrates embodiments of a method of utilizing an ASR service.

FIG. 7 illustrates embodiments of a method of utilizing an ASR service. At 700, a ASR component 307 is configured and started in some embodiments. For example, one or more CGs (and corresponding ASGs) are configured, models are loaded into hosts, etc. Examples of configuring ASGs are described with respect to FIG. 6.

With an up and running ASR component 307, in some embodiments, a "new" model is received and loaded at 701. In some embodiments, new models are loaded by submitting a "dummy" request to a host that does not include audio data. The lack of anything to operate on causes the host to load the new model from the MASS 313. As such, when a "real" request comes, the new model is loaded and ready to use. Note, that depending upon utilization, a new model may force a lesser used model to be flushed to disk or removed all together from the host.

At some point in time, a request (including data) to perform an ASR for audio data using a particular hosted ML model is received at 703. For example, an audio data utterance provided by a user to a bot is received at the ASR component 307 at the router 403.

The request data is routed to the appropriate ML model using a router and load balancer at 705. In some embodiments, the request data is routed to a plurality of ML models to perform testing. For example, the request data is routed to two or more ML models. The result of the ASRs performed on the request data may then be evaluated to determine which of the ML models performs better.

In some embodiments, which model the request data is routed varies according to a value. For example, the request data is routed to two or more ML models on a percentage basis (for example, 25% go to a first model and 75% go to a second model, etc.). The result of the ASRs performed on the request data may then be evaluated to determine which of the ML models performs better.

The appropriate ML model performs the ASR on the routed request data at 707 and provides a result at 709. For example, one or more FSTs are utilized and the result is provided back to a requesting bot. Note at this point, a model-specific FST and/or static and supplemental files may be retrieved from MASS 313 if needed.

In some embodiments, the result of the ASR and/or the request data is stored at 711 such as detailed earlier. In some embodiments, natural language understanding is performed on the result.

FIG. 8 illustrates examples of rules to be used to generate a path for a load balancer to use. In some embodiments, these rules are a part of library 402. As shown, each rule has a name, one or more conditions, an endpoint path, and a name of the CG.

The first exemplary rule 801 is "always true" and routes all traffic to the CG US-English-Cell-1. The second exemplary rule 803 uses the ID of the bot to determine which endpoint and CG to route to. The third exemplary rule 805 uses the ID of the account to determine which endpoint and CG to route to. The account ID may be of the end-user or of the bot owner depending upon the implementation. The fourth exemplary rule 807 uses the bot ID and account ID to determine which endpoint and CG to route to. Like the third exemplary rule 805, the account ID may be of the end-user or of the bot owner depending upon the implementation. Note the fourth exemplary rule 807 demonstrates that multiple conditions may need to be satisfied.

Exemplary rule 809 is locale specific. For example, a user in New York City very likely has a different accent than a user in New Orleans. In this particular rule, the locale is in Louisiana and the user is presumed to speak English. This rule also takes into account the frequency of the audio data and an audio profile for the input source (far-field, close to microphone, etc.). For example, lower frequency audio from a far-field device may need more processing than higher frequency audio that comes from a more direct microphone source.

Exemplary rule 811 illustrates an example of a rule for testing different models. When the condition is met, two CGs have the request routed to them. A determination of model is better can then be made.

Figure 9:
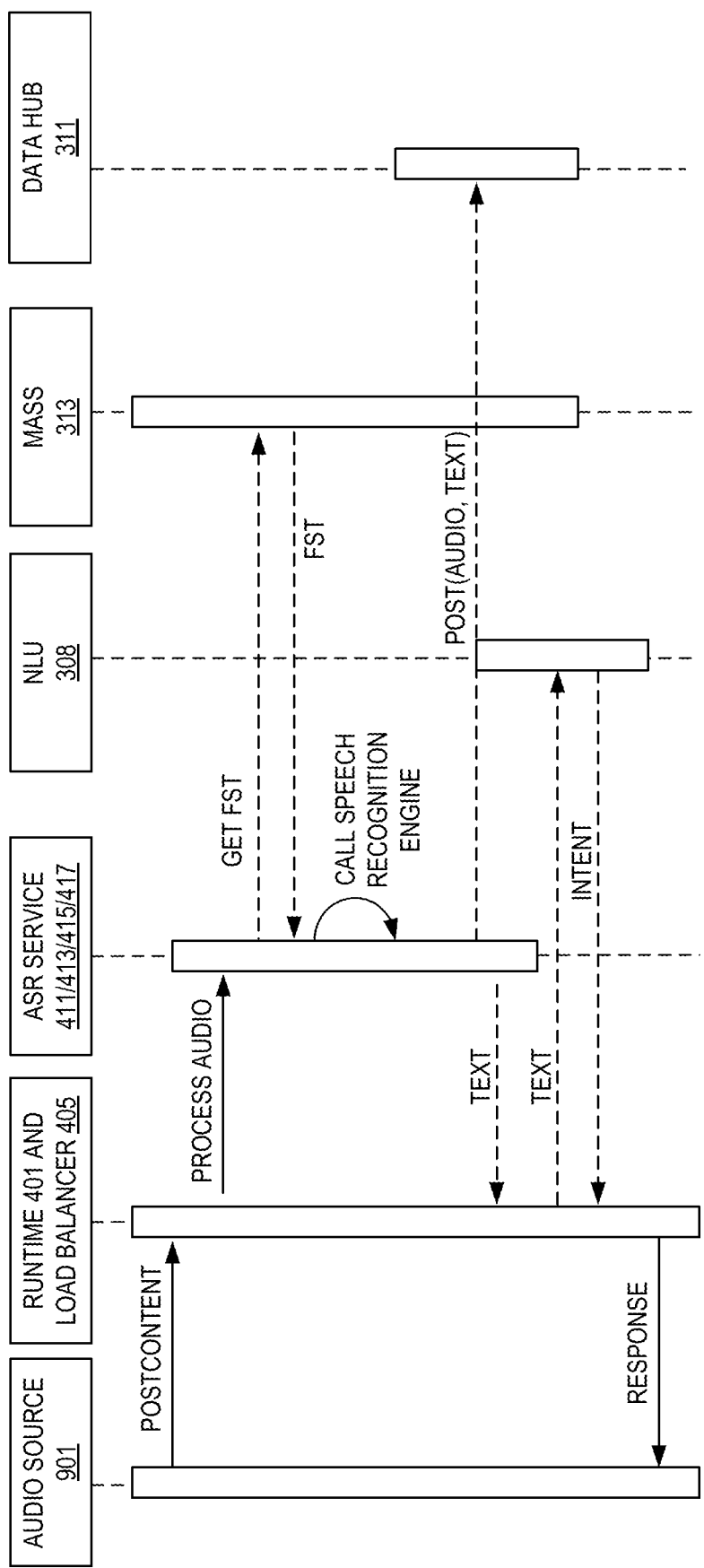
FIG. 9 illustrates examples of embodiments of sequences of operations when ASR is requested.

FIG. 9 illustrates examples of embodiments of sequences of operations when ASR is requested. An audio source 901 (such as a bot, end-user, etc.) provides post-content (audio data) to the runtime 401. Typically, this is in the form of a request. The request may include the post-content or provide a link to it.

The runtime 401 and load balancer 405 send a request to process the audio data to an appropriate ASR service 411/413/415/417 as detailed above. For example, the router 403 uses information about the audio source 901, the audio itself, etc., and rules of the library 402 to generate a path for a CG that is used by the load balancer 405 to determine the appropriate ASR service 411/413/415/417 as detailed above.

The ASR service 411/413/415/417 requests one or more FSTs (a model specific, static, supplemental, etc.) from MASS 313 (if needed) and calls its speech recognition engine to process the audio using the appropriate FSTs. Note, the model-specific (e.g., bot) FST is more likely to be called at request than the static and supplemental FSTs due to the sizes of these files as noted above.

Figure 10:
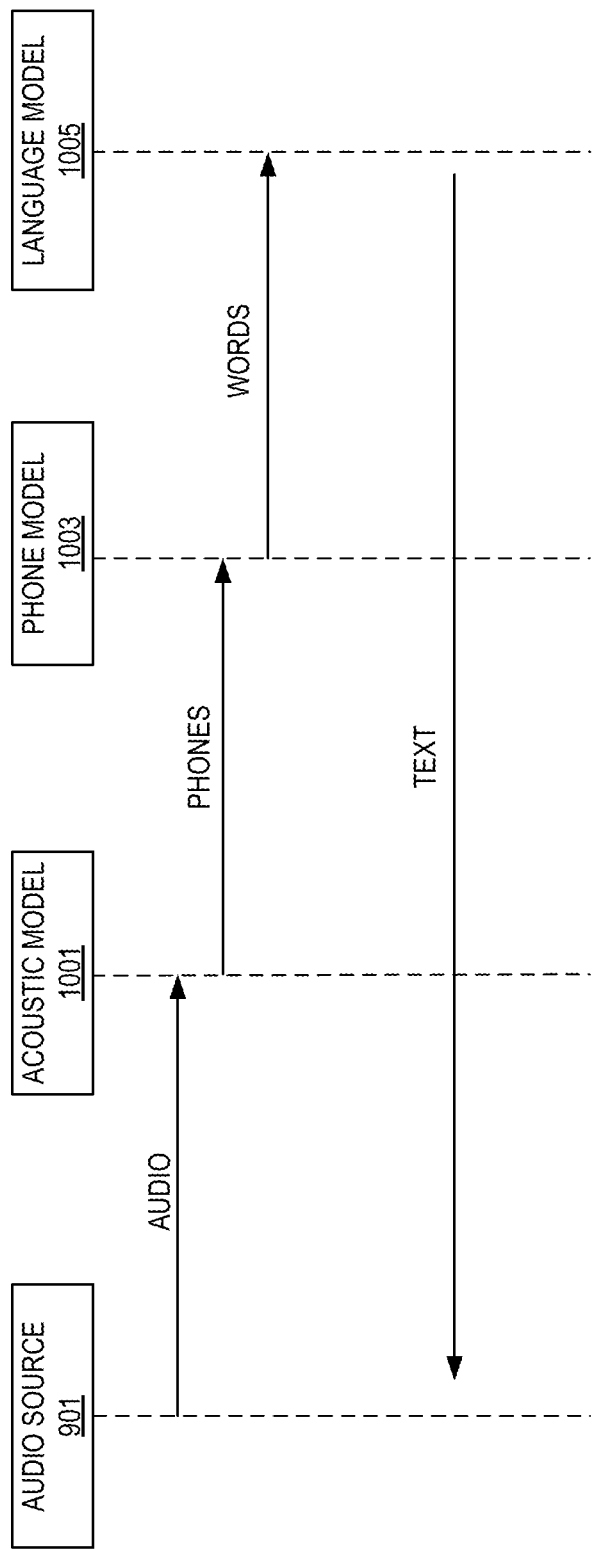
FIG. 10 illustrates an example of using a plurality of models.

The speech recognition engine uses the appropriate FSTs to generate text from the audio data. FIG. 10 illustrates an example of using a plurality of models. As such, the ASR starts working in the acoustic model. The acoustic model takes the audio as input and provides possible phones as the output. These phones are then mapped to possible words using the phone model 1103. The possible words can then be combined with conditional probabilities of n-grams to determine the text produced. The n-grams are provided by the language model FST 1105, supplemental model FST, and/or the bot specific model FST. The bot-specific FST biases the model toward provided sample phrases. In some embodiments, post-processing normalizes words to the expected form for the NLU and includes transforms such as dense word embedding, lower-casing, etc.

The supplied audio and generated text are stored in the data hub 311 and/or provided to the runtime 401. The runtime 401 may provide the generated text to audio source 901 and/or subject the text to NLU using an NLU component 308. Output of the NLU component 308 may then be provided via the runtime 401 to the audio source 901.

Figure 11:
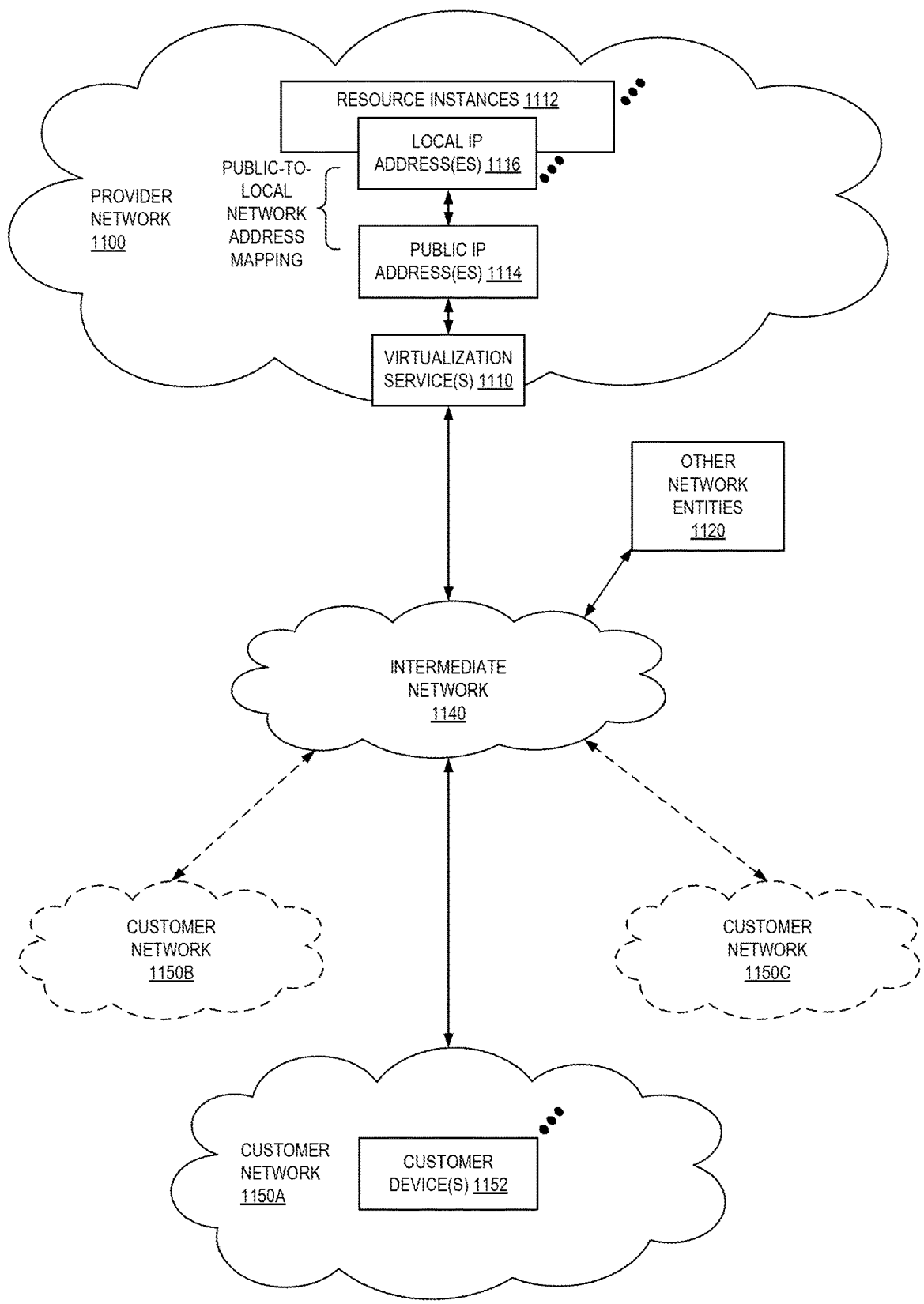
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
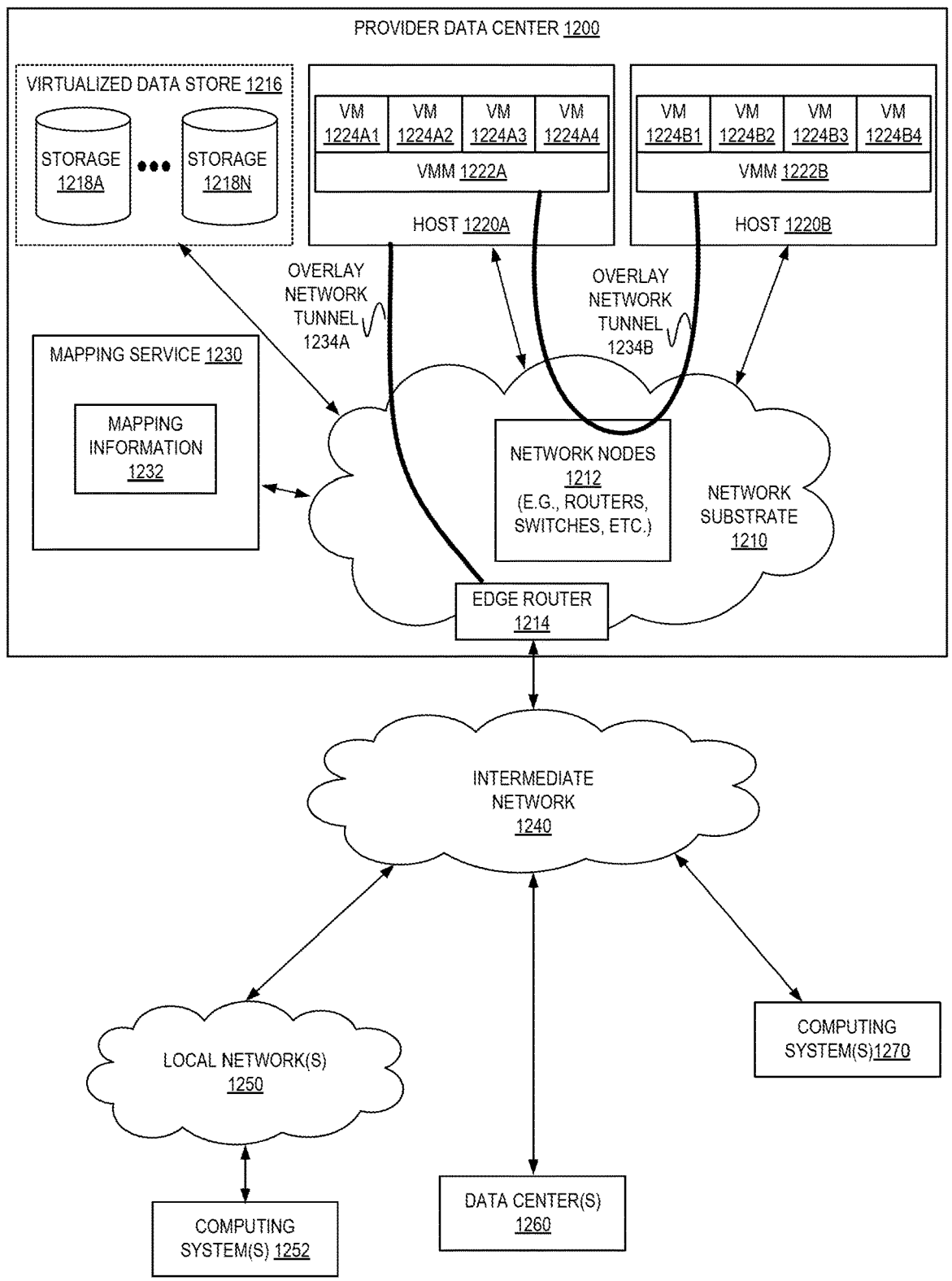
FIG. 12 illustrates an example data center that implements an overlay network on a network substrate using IP tunneling technology according to some embodiments.

FIG. 12 illustrates an example data center that implements an overlay network on a network substrate using IP tunneling technology, according to some embodiments. A provider data center 1200 may include a network substrate that includes networking nodes 1212 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1210 using tunnels. The IP tunneling technology may provide a mapping and encapsulating system for creating an overlay network on a network (e.g., a local network in data center 1200 of FIG. 12) and may provide a separate namespace for the overlay layer (the public IP addresses) and the network substrate 1210 layer (the local IP addresses). Packets in the overlay layer may be checked against a mapping directory (e.g., provided by mapping service 1230) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1230) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 12, an example overlay network tunnel 1234A from a virtual machine (VM) 1224A (of VMs 1224A1-1224A4, via VMM 1222A) on host 1220A to a device on the intermediate network 1250 and an example overlay network tunnel 1234B between a VM 1224A (of VMs 1224A1-1224A4, via VMM 1222A) on host 1220A and a VM 1224B (of VMs 1224B1-1224B4, via VMM 1222B) on host 1220B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 12, at least some networks in which embodiments may be implemented may include hardware virtualization technology that enables multiple operating systems to run concurrently on a host computer (e.g., hosts 1220A and 1220B of FIG. 12), i.e. as virtual machines (VMs) 1224 on the hosts 1220. The VMs 1224 may, for example, be executed in slots on the hosts 1220 that are rented or leased to customers of a network provider. A hypervisor, or virtual machine monitor (VMM) 1222, on a host 1220 presents the VMs 1224 on the host with a virtual platform and monitors the execution of the VMs 1224. Each VM 1224 may be provided with one or more local IP addresses; the VMM 1222 on a host 1220 may be aware of the local IP addresses of the VMs 1224 on the host. A mapping service 1230 may be aware of (e.g., via stored mapping information 1232) network IP prefixes and IP addresses of routers or other devices serving IP addresses on the local network. This includes the IP addresses of the VMMs 1222 serving multiple VMs 1224. The mapping service 1230 may be centralized, for example on a server system, or alternatively may be distributed among two or more server systems or other devices on the network. A network may, for example, use the mapping service technology and IP tunneling technology to, for example, route data packets between VMs 1224 on different hosts 1220 within the data center 1200 network; note that an interior gateway protocol (IGP) may be used to exchange routing information within such a local network.

In addition, a network such as the provider data center 1200 network (which is sometimes referred to as an autonomous system (AS)) may use the mapping service technology, IP tunneling technology, and routing service technology to route packets from the VMs 1224 to Internet destinations, and from Internet sources to the VMs 1224. Note that an external gateway protocol (EGP) or border gateway protocol (BGP) is typically used for Internet routing between sources and destinations on the Internet. FIG. 12 shows an example provider data center 1200 implementing a network that provides resource virtualization technology and that provides full Internet access via edge router(s) 1214 that connect to Internet transit providers, according to some embodiments. The provider data center 1200 may, for example, provide customers the ability to implement virtual computing systems (VMs 1224) via a hardware virtualization service and the ability to implement virtualized data stores 1216 on storage resources 1218A-1218N via a storage service.

The data center 1200 network may implement IP tunneling technology, mapping service technology, and a routing service technology to route traffic to and from virtualized resources, for example to route packets from the VMs 1224 on hosts 1220 in data center 1200 to Internet destinations, and from Internet sources to the VMs 1224. Internet sources and destinations may, for example, include computing systems 1270 connected to the intermediate network 1240 and computing systems 1252 connected to local networks 1250 that connect to the intermediate network 1240 (e.g., via edge router(s) 1214 that connect the network 1250 to Internet transit providers). The provider data center 1200 network may also route packets between resources in data center 1200, for example from a VM 1224 on a host 1220 in data center 1200 to other VMs 1224 on the same host or on other hosts 1220 in data center 1200.

A service provider that provides data center 1200 may also provide additional data center(s) 1260 that include hardware virtualization technology similar to data center 1200 and that may also be connected to intermediate network 1240. Packets may be forwarded from data center 1200 to other data centers 1260, for example from a VM 1224 on a host 1220 in data center 1200 to another VM on another host in another, similar data center 1260, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1218A-1218N, as virtualized resources to customers of a network provider in a similar manner.

Figure 13:
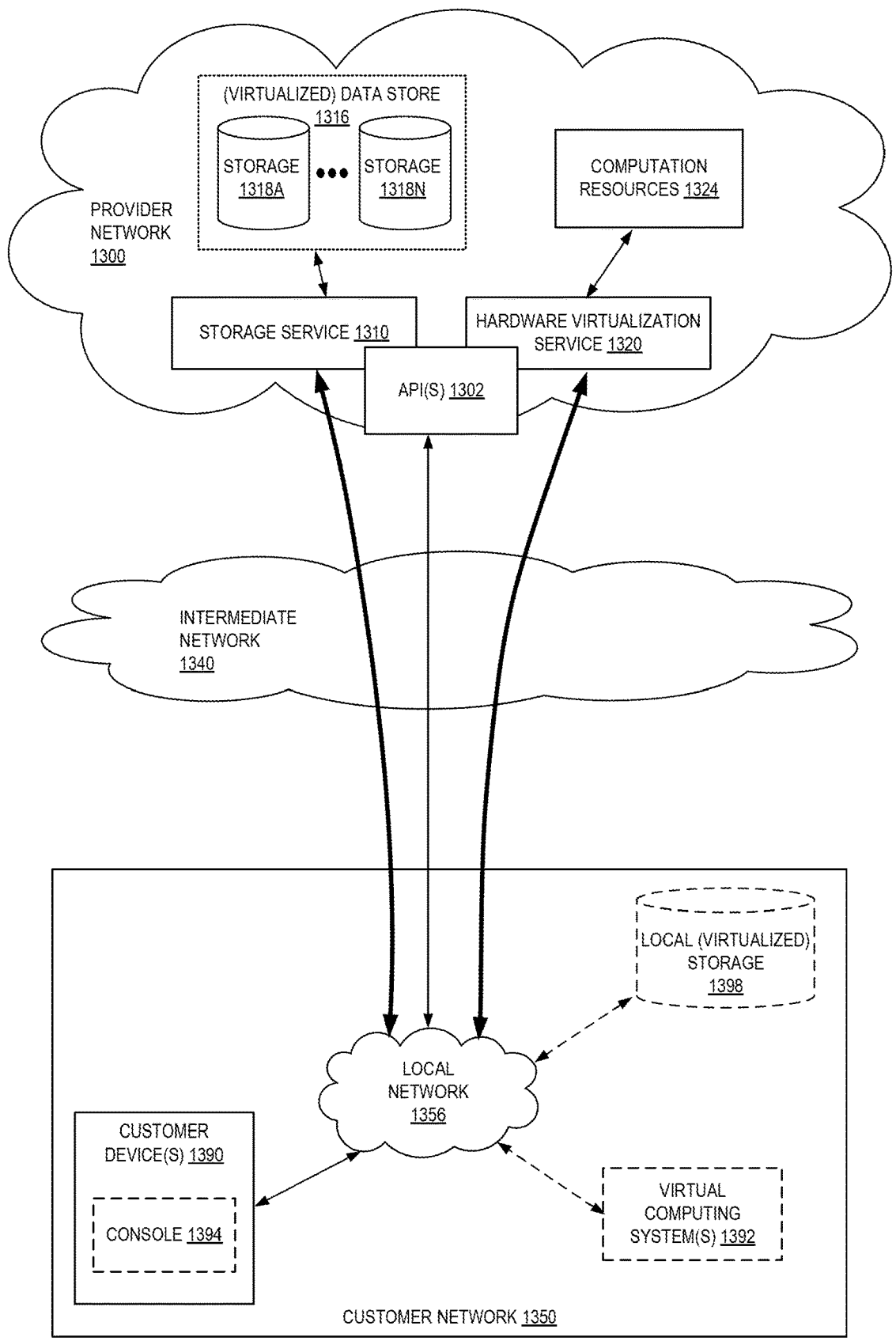
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Figure 14:
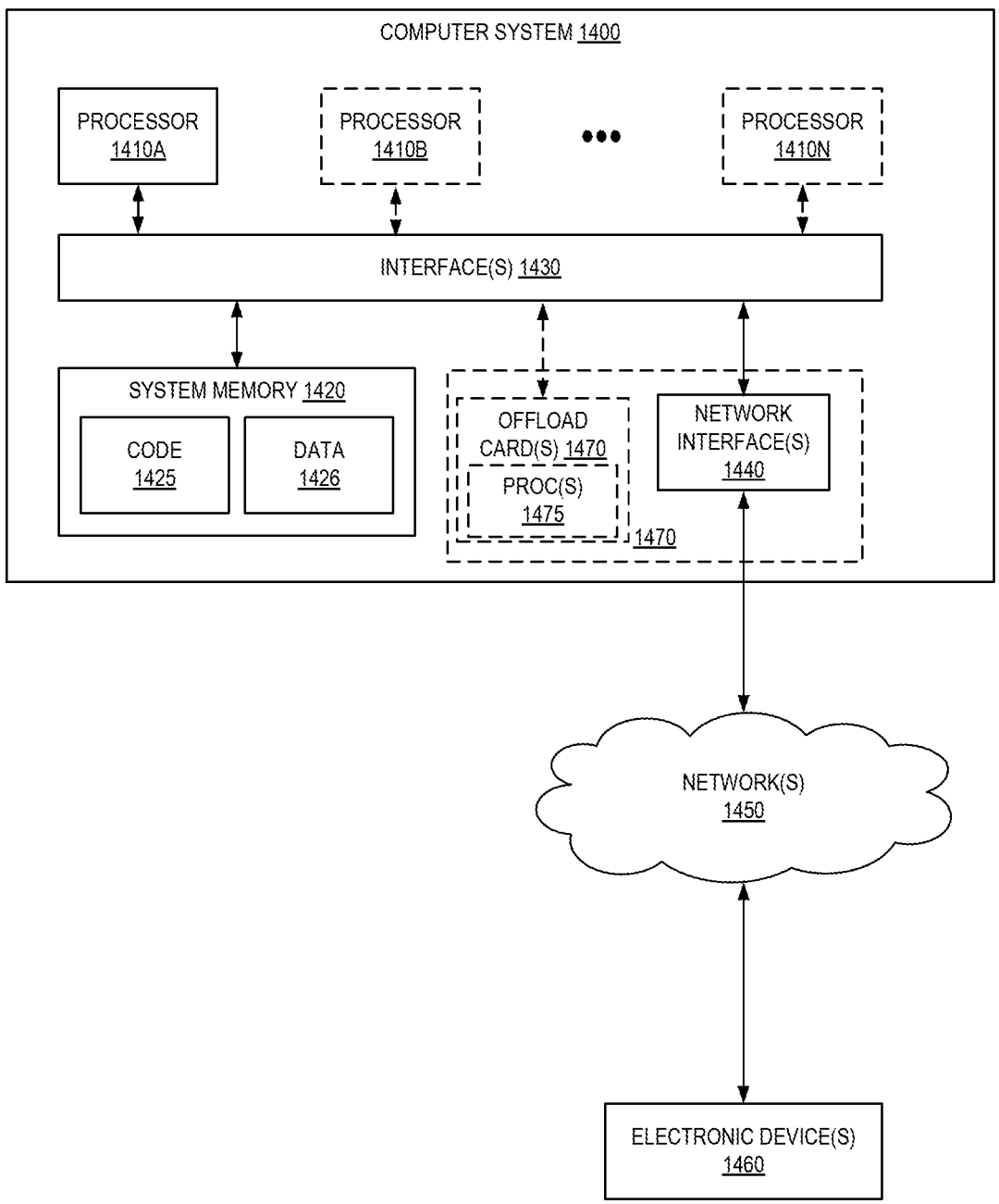
FIG. 14 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as code 1425 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Figure 15:
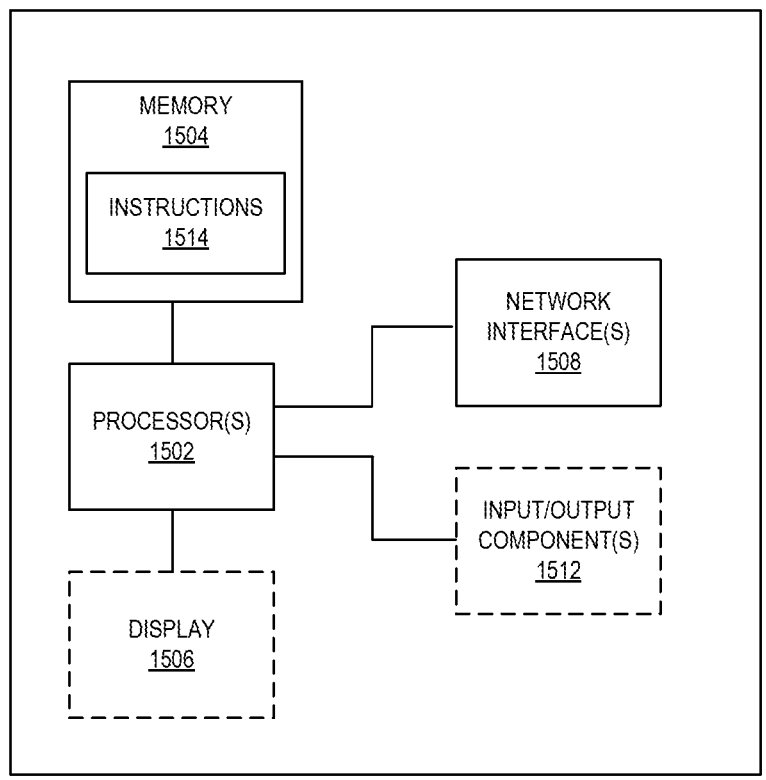
FIG. 15 illustrates a logical arrangement of a set of general components of an exemplary computing device that can be utilized in accordance with various embodiments.

FIG. 15 illustrates a logical arrangement of a set of general components of an example computing device 1500 such as the hosted ML service, etc. Generally, a computing device 1500 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1504) to store code (e.g., instructions 1514) and/or data, and a set of one or more wired or wireless network interfaces 1508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1504) of a given electronic device typically stores code (e.g., instructions 1514) for execution on the set of one or more processors 1502 of that electronic device. One or more parts of various embodiments may be implemented using different combinations of software, firmware, and/or hardware.

A computing device 1500 can include some type of display element 1506, such as a touch screen or liquid crystal display (LCD), although many devices such as portable media players might convey information via other means, such as through audio speakers, and other types of devices such as server end stations may not have a display element 1506 at all. As discussed, some computing devices used in some embodiments include at least one input and/or output component(s) 1512 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 16:
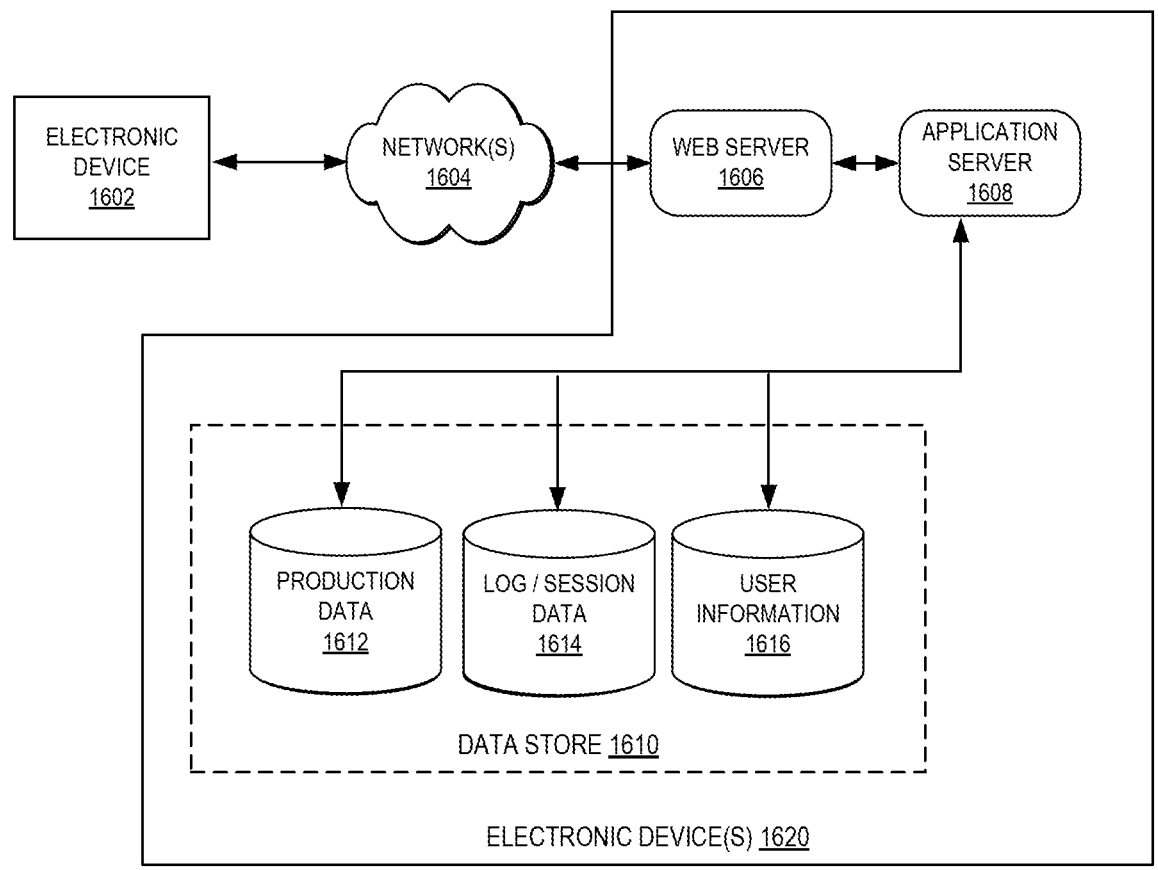
FIG. 16 illustrates an example of an environment for implementing aspects in accordance with various embodiments.

As discussed, different approaches can be implemented in various environments in accordance with the described embodiments. For example, FIG. 16 illustrates an example of an environment 1600 for implementing aspects in accordance with various embodiments. For example, in some embodiments requests are HyperText Transfer Protocol (HTTP) requests that are received by a web server (e.g., web server 1606), and the users, via electronic devices, may interact with the provider network via a web portal provided via the web server 1606 and application server 1608. As will be appreciated, although a web-based environment is used for purposes of explanation, different environments may be used, as appropriate, to implement various embodiments. The system includes an electronic client device 1602, which may also be referred to as a client device and can be any appropriate device operable to send and receive requests, messages or information over an appropriate network 1604 and convey information back to a user of the device 1602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1604 includes the Internet, as the environment includes a web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device 1602 and handling a majority of the data access and business logic for an application. The application server 1608 provides access control services in cooperation with the data store 1610 and is able to generate content such as text, graphics, audio, video, etc., to be transferred to the client device 1602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1602 and the application server 1608, can be handled by the web server 1606. It should be understood that the web server 1606 and application server 1608 are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store 1610 also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store 1610 might access the user information 1616 to verify the identity of the user and can access a production data 1612 to obtain information about items of that type. The information can then be returned to the user, such as in a listing of results on a web page that the user is able to view via a browser on the user device 1602. Information for a particular item of interest can be viewed in a dedicated page or window of the browser.

The web server 1606, application server 1608, and/or data store 1610 may be implemented by one or more electronic devices 1620, which can also be referred to as electronic server devices or server end stations, and may or may not be located in different geographic locations. Each of the one or more electronic devices 1620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, from a bot, a request to perform speech recognition on speech data, using a particular speech recognition service, the speech data being user input into the bot;
   determining a group of hosts to route the speech data to, the group of hosts to host a plurality of speech recognition services including the particular speech recognition service;
   determining a path to the group of hosts using a set of one or more rules;
   sending, to a load balancer, the speech data and the path to the group of hosts;
   determining, using the load balancer, a particular host of the group of hosts to perform speech recognition on the speech data, the particular host having speech recognition models in memory to process the request, wherein the particular host of the group of hosts is preferred for performing the speech recognition on the speech data;
   routing the speech data to the particular host of the group of hosts;
   performing speech recognition on the speech data using the particular host; and
   providing a text result of the speech recognition to the bot.

2. The computer-implemented method of claim 1, wherein the particular speech recognition service includes an acoustic model, a phone model, and a language model.

3. The computer-implemented method of claim 1, wherein the set of one or more rules defines at least one condition, an identifier of the particular speech recognition service, and an identifier of the group hosts to use when the at least one condition is satisfied.

4. A computer-implemented method comprising:
   receiving a request to perform speech recognition on speech data, using a particular speech recognition service;
   determining a group of hosts to route the speech data to, the group of hosts to host a plurality of speech recognition services including the particular speech recognition service;
   determining a path to the group of hosts using a set of one or more rules;
   determining a particular host of the group of hosts to perform speech recognition on the speech data, the particular host having the particular speech recognition service in memory to process the request, wherein the particular host of the group of hosts is preferred for performing speech recognition on the speech data;
   routing the speech data to the particular host of the group of hosts;
   performing speech recognition on the speech data using the particular host; and
   providing a text result of the speech recognition.

5. The computer-implemented method of claim 4, wherein each host of the group of hosts maps to at least one virtual node, and an identifier of a machine learning model is hashed to the at least one virtual node.

6. The computer-implemented method of claim 4, wherein the particular host of the group of hosts is a first particular host, the method further comprising:
   determining a second particular host of the group of hosts to perform speech recognition on the speech data, the second particular host having the speech recognition service in memory to process the request;
   routing the speech data to the second particular host concurrently with the first particular host; and performing speech recognition on the speech data using the second particular host.

7. The computer-implemented method of claim 4, wherein the group of hosts is an autoscaling group that scales a number of hosts based on throughput of machine learning models it hosts.

8. The computer-implemented method of claim 4, wherein the request and the path are routed according to listener rules.

9. The computer-implemented method of claim 4, wherein the set of one or more rules defines at least one condition, an identifier of the particular speech recognition service, and an identifier of the group of hosts to use when the at least one condition is satisfied.

10. The computer-implemented method of claim 9, wherein the at least one condition is related to one or more of a bot identifier, an account identifier, a frequency of the speech data, a location, or an audio profile.

11. The computer-implemented method of claim 4, wherein the particular speech recognition service includes an acoustic model, a phone model, and a language model.

12. The computer-implemented method of claim 4, further comprising:
performing natural language understanding on the text result using a machine learning model.

13. The computer-implemented method of claim 4, further comprising:
storing data including the speech data and the text result in a data hub accessible to a subscribing entity.

14. The computer-implemented method of claim 4, wherein the request is user input received from a bot.

15. A system comprising:
a chatbot implemented by a first one or more electronic devices; and
a speech recognition service implemented by a second one or more electronic devices, the speech recognition service including instructions that upon execution cause the speech recognition service to:
receive a request to perform speech recognition on speech data from the chatbot, using a particular speech recognition service;
determine a group of hosts to route the speech data to, the group of hosts to host a plurality of speech recognition services including the particular speech recognition service;
determine a path to the group of hosts using a set of one or more rules;
determine a particular host of the group of hosts to perform speech recognition on the speech data, the particular host having the particular speech recognition service in memory to process the request, wherein the particular host of the group of hosts is preferred for performing speech recognition on the speech data;
route the speech data to the particular host of the group of hosts;
perform speech recognition on the speech data using the particular host; and
provide a text result of the speech recognition to the chatbot.

16. The system of claim 15, wherein the set of one or more rules defines at least one condition, an identifier of the particular speech recognition service, and an identifier of the group of hosts to use when the at least one condition is satisfied.

17. The system of claim 16, wherein the at least one condition is related to one or more of a bot identifier, an account identifier, a frequency of the speech data, a location, or an audio profile.

18. The system of claim 15, wherein the particular speech recognition service includes an acoustic model, a phone model, and a language model.

19. The system of claim 15, wherein the group of hosts is an autoscaling group that scales a number of hosts based on throughput of machine learning models it hosts.

20. The system of claim 15, wherein the request and the path are routed according to listener rules.

\* \* \* \* \*